United States Patent [19]

Grundmann

[11] 4,051,917
[45] Oct. 4, 1977

[54] SOUND-DAMPING HOUSING

[75] Inventor: Edgard Grundmann, Fallersleben, Germany

[73] Assignee: Volkswagenwerk Aktiengesellschaft, Wolfsburg, Germany

[21] Appl. No.: 658,900

[22] Filed: Feb. 18, 1976

[30] Foreign Application Priority Data

Mar. 1, 1975 Germany .................... 2509065

[51] Int. Cl.² .............................................. F01N 7/16
[52] U.S. Cl. ................................. 181/200; 181/283
[58] Field of Search ............... 181/33 K, 33 B, 36 D, 181/36 E, 62

[56] References Cited

U.S. PATENT DOCUMENTS

| 1,335,090 | 3/1920 | Carter | 181/33 K |
| 3,750,615 | 8/1973 | Haft et al. | 181/33 K |

FOREIGN PATENT DOCUMENTS

| 1,577,688 | 8/1969 | France | 181/33 K |
| 1,169,205 | 5/1961 | Germany | 181/33 K |
| 224,736 | 3/1943 | Switzerland | 181/33 K |

Primary Examiner—Stephen J. Tomsky
Attorney, Agent, or Firm—Spencer & Kaye

[57] ABSTRACT

A sound-damping housing suitable for use with a piece of sound-generating equipment. The housing has inner and outer housing parts, the former forming a chamber for receiving the piece of sound-generating equipment, with the two housing parts forming between themselves a second chamber for receiving a sound-damping liquid. This second chamber surrounds the receiving chamber, and suitable provision is made for allowing the piece of sound-generating equipment to be inserted into and withdrawn from the receiving chamber. By virtue of this arrangement, the sound-damping housing and the piece of sound-generating equipment may be transported separately from each other. Moreover, the liquid need not be introduced into the sound-damping housing until after the same has been transported to the place where it is to be installed, thus making it easier for the sound-damping housing to be transported.

10 Claims, 2 Drawing Figures

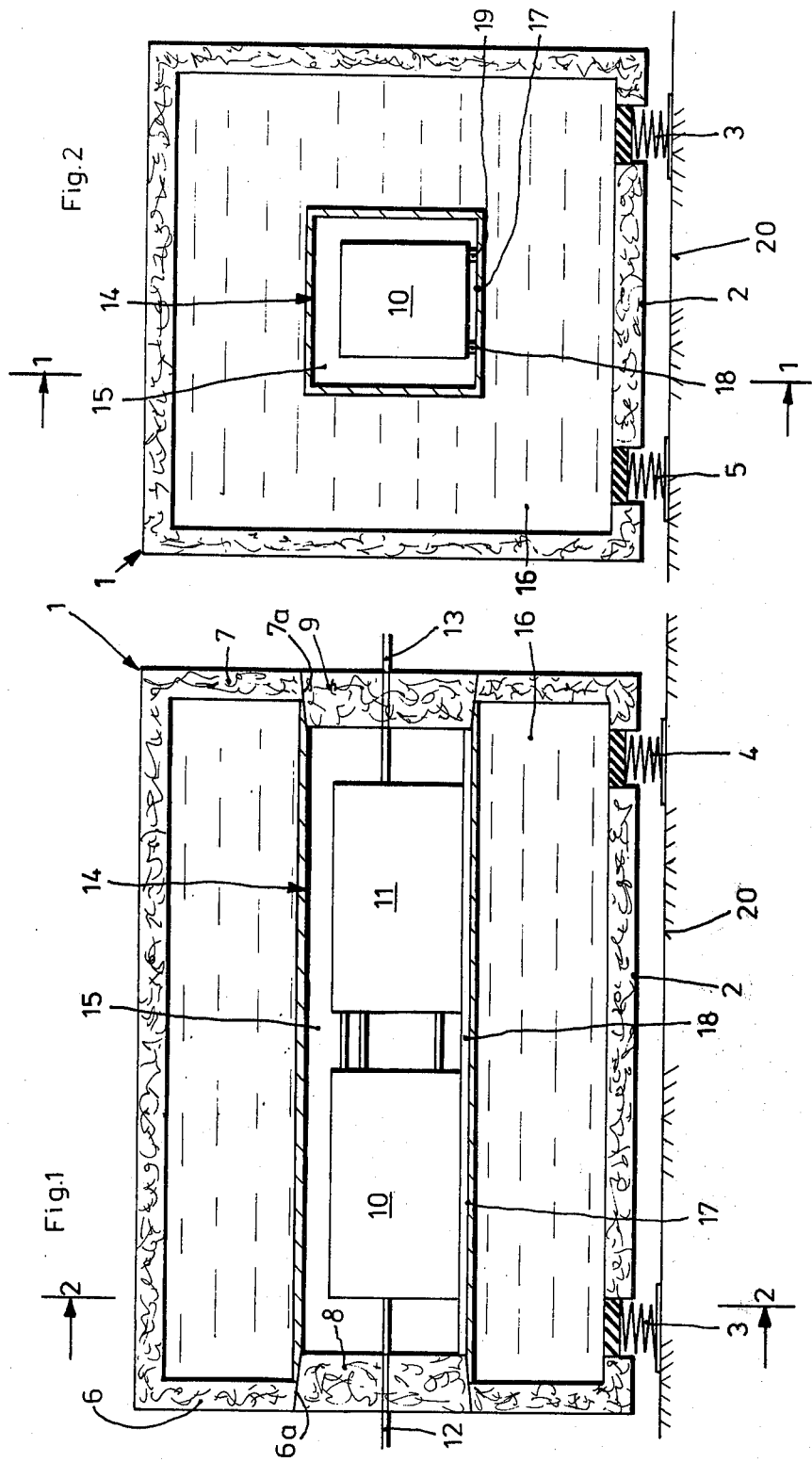

SOUND-DAMPING HOUSING

BACKGROUND OF THE INVENTION

The present invention relates to a housing-like arrangement for damping the sound produced by a piece of equipment, particularly an internal combustion engine.

More particularly, the present invention relates to a housing arrangement which makes use of the sound-absorbing characteristic of a liquid.

The fact that liquid has a sound-absorbing effect is known, for example, from liquid-cooled internal combustion engines in which water is circulated through a double-walled cylinder housing.

Another known arrangement of this type is the one shown, for example, in German published patent application No. 1,169,205 of Apr. 30th, 1964, which describes a structure where an annular chamber containing liquid is provided for the purpose of cooling and muffling the sound of gaseous streams. One characteristic feature of this arrangement is that the conduits through which the liquid flows are integral parts of the arrangement.

Another known arrangement in which a liquid is held within a sound-damping housing is the one shown in Swiss Pat. No. 224,736 of Dec. 15th, 1942, in which an internal combustion engine is built into a sound-insulating, portable housing having air inlet and outlet channels which are provided with baffles for the purpose of muffling sound. the structure shown in this patent has a double bottom which forms a container for a liquid, but the liquid is not intended to serve as a sound-damping medium, as evidenced by the fact that the liquid is the fuel for the internal combustion engine, so that it is continuously consumed until the spaced is emptied of liquid. In this arrangement, too, the chamber in which the liquid is contained is part of the sound-generating equipment.

Conventional house-like arrangements of the above type have the drawback that due to the fact that they are fashioned as sound-damping structures, they are heavy and are therefore difficult to transport. This is particularly so in the case of the structure shown in the mentioned Swiss patent because the internal combustion itself is built into the housing-like sound-damping arrangement.

It is, therefore, the primary object of the present invention to provide a housing-like sound-damping arrangement which is readily transportable and which can be used for sound-damping purpose in conjunction with various pieces of sound-generating equipment.

BRIEF DESCRIPTION OF THE INVENTION

With the above object in view, the present invention resides, basically, in a sound-damping housing which is suitable for use with a piece of sound-generating equipment. The housing has inner and outer housing means, the former forming a first chamber for receiving the piece of sound-generating equipment, and the two housing means form between themselves a second chamber for receiving a sound-damping liquid. This second chamber surrounds the first chamber, there being means which allow the insertion and withdrawal of the piece of sound-generating equipment into and out of the first chamber. Consequently, the sound-damping and the piece of sound-generating equipment may be transported separately from each other.

BRIEF DESCRIPTION OF THE DRAWINGS

FIG. 1 is a sectional elevation, taken on line 1—1 of FIG. 2, of one embodiment of a sound-damping housing according to the present invention.

FIG. 2 is a sectional elevation of the same embodiment, taken on line 2—2 of FIG. 1.

DETAILED DESCRIPTION OF THE PREFERRED EMBODIMENTS

Referring now to the drawings, the same show a sound-damping housing arrangement according to the present invention which is provided with a heat-insulating, generally box-shaped outer housing 1 which, in the illustrated embodiment, constitutes all six outer surfaces of the arrangement. The lower support wall 2, whose upper face serves as the surface on which the housing is supported, is provided with four vibration insulators in the form of springs resting on a flooring 20, three of the springs being shown in the drawings at 3, 4 and 5. The springs are received within appropriately configured recesses provided in the wall 2.

The two end walls 6 and 7 of the housing are provided with openings 6a and 7a, respectively, forming means through which sound-generating components may be inserted into and withdrawn from the arrangement, these openings being closed,during operation, by sound-insulating covers 8 and 9, respectively.

The outer housing 1 is watertight and has arrangement within it an inner housing 14 which is made of a material having good heat-conducting characteristics, such as metal. This inner housing 14 forms a first chamber 15 for receiving the piece of sound-generating equipment, the latter standing on two longitudinal rails 18 and 19 which stand in the lower wall 17 of the housing 14.

In the illustrated embodiment, the sound-generating equipment is constituted by a unit 10 which incorporates an internal combustion engine and a compressor for a heat pump, the unit 10 being connected to a second unit 11 which incorporates a condensor and at least one heat exchanger. Conduits means 12 are provided for supplying air and fuel to the unit 10, there being further conduit means 13 connected with the unit 11 for supplying and carrying off the working medium, the exhaust gases, and the like. The arrangement of the parts in such that the openings 6a and 7a are in alignment with the chamber 15 formed by the inner housing 14, so that when at least one of the two covers is out of place, the sound-generating equipment 10, 11, may be inserted into and withdrawn from the receiving chamber 15.

The conduit means pass through the respective covers 8 and 9, with suitable sound-proofing being provided. If desired, the conduit means may instead pass directly through a wall portion of the outer housing 1.

The inner and outer housings which surround each other thus form between themselves a second chamber 16 which is adapted to receive a sound-damping liquid, such as water, suitable filler and drain openings (not shown) being provided in the outer housing. As shown in the drawings, the walls 2 and 17 are at different heights and the second chamber, in sectional elevation, completely surrounds the first chamber.

It will be seen from the above that by so arranging the parts that the piece of sound-generating equipment can be inserted into and withdrawn from the sound-damping housing, the two components — i.e., the sound-damping housing and the piece of sound-generating equipment — may be transported separately from each other. Furthermore, the second chamber 16 need not be filled with the sound-damping liquid until the housing has been transported to the site where it is to be used, so that when the housing itself is being transported — it being designed to be sufficiently rigid to allow it to be transported — it is relatively light. During operation of the sound-generating equipment, the second chamber will remain filled with liquid.

It has, moreover, been found that thanks to the mass of the water in chamber 16, which is relatively large with respect to the sound-generating equipment 10, 11, the natural frequency of the housing arrangement according to the present invention will be favorable with respect to the exciter frequencies of the equipment 10, 11. Even the vibrations transmitted to the flooring 20 via the vibration insulating springs will be small, which is especially important if the flooring is that of a building.

In practice, the heat radiated by the motor forming part of the unit 10 is not lost, instead, it is utilized to elevate the temperature of the water in the chamber 16. The housing arrangement as a whole is, therefore, suitable for use as a hot water storage device, which is a particularly useful application of the device when the housing is installed in a building, in which case the housing can serve as the hot water storage device of the building. Aside of this, the chamber 15 will remain relatively warm even if the motor in unit 10 is not operated for an extended period of time. It will be appreciated that this reduces lubrication problems of the equipment 10, 11, and therefore contributes to extending its useful life.

It will be understood that the above description of the present invention is susceptible to various modifications, changes and adaptations, and the same are intended to be comprehended within the meaning and range of equivalents of the appended claims.

What is claimed is:

1. For use with a piece of sound-generating equipment, a sound-damping housing having inner and outer housing means surrounding each other, said inner housing means having a lower wall and said outer housing means having a support wall, said walls being arranged at different heights, said inner housing means forming a first chamber for receiving the piece of sound-generating equipment, said inner and outer housing means forming between themselves a second chamber for receiving and remaining filled with a sound-damping liquid during the operation of the piece of sound-generating equipment, said second chamber in sectional elevation completely surrounding said first chamber; and means communicating with said first chamber for allowing the insertion and withdrawal of the piece of sound-generating equipment into and out of said first chamber, in consequence of which said sound-damping housing and the piece of sound-generating equipment may be transported separately from each other.

2. A sound-damping housing defined in claim 1, wherein said second chamber is filled with water.

3. A sound-damping housing as defined in claim 1, wherein said means for allowing the insertion and withdrawal of the piece of sound-generating equipment comprise at least one opening provided in said outer housing means, said opening being in alignment with said first chamber formed by said inner housing means, and a second-insulating cover for said opening.

4. A sound-damping housing as defined in claim 1, further comprising conduit means connected to a piece of sound-generating equipment in said first chamber and passing through said outer housing means in a region thereof which is in alignment with said first chamber.

5. A sound-damping housing as defined in claim 1, wherein said means for allowing the insertion and withdrawal of the piece of sound-generating equipment comprise at least one opening provided in said outer housing means, said opening being in alignment with said first chamber formed by said inner housing means, and a sound-insulating cover for said opening; and conduit means connected to a piece of sound-generating equipment in said first chamber and passing through said cover when the same covers said opening.

6. A sound-damping housing as defined in claim 1, wherein said outer housing means is heat insulating.

7. A sound-damping housing as defined in claim 6, wherein said second chamber is filled with water, said housing being suitable for use as a hot water storage device.

8. A sound-damping housing as defined in claim 7, wherein said inner housing means is made of a material having good heat-conducting characteristics.

9. A sound-damping housing as defined in claim 1, wherein said outer housing means has a wall which serves as the support surface for the housing.

10. A sound-damping housing as defined in claim 9, wherein said wall serving as said support surface is provided with vibration insulating means.

* * * * *